United States Patent Office 3,258,275
Patented June 28, 1966

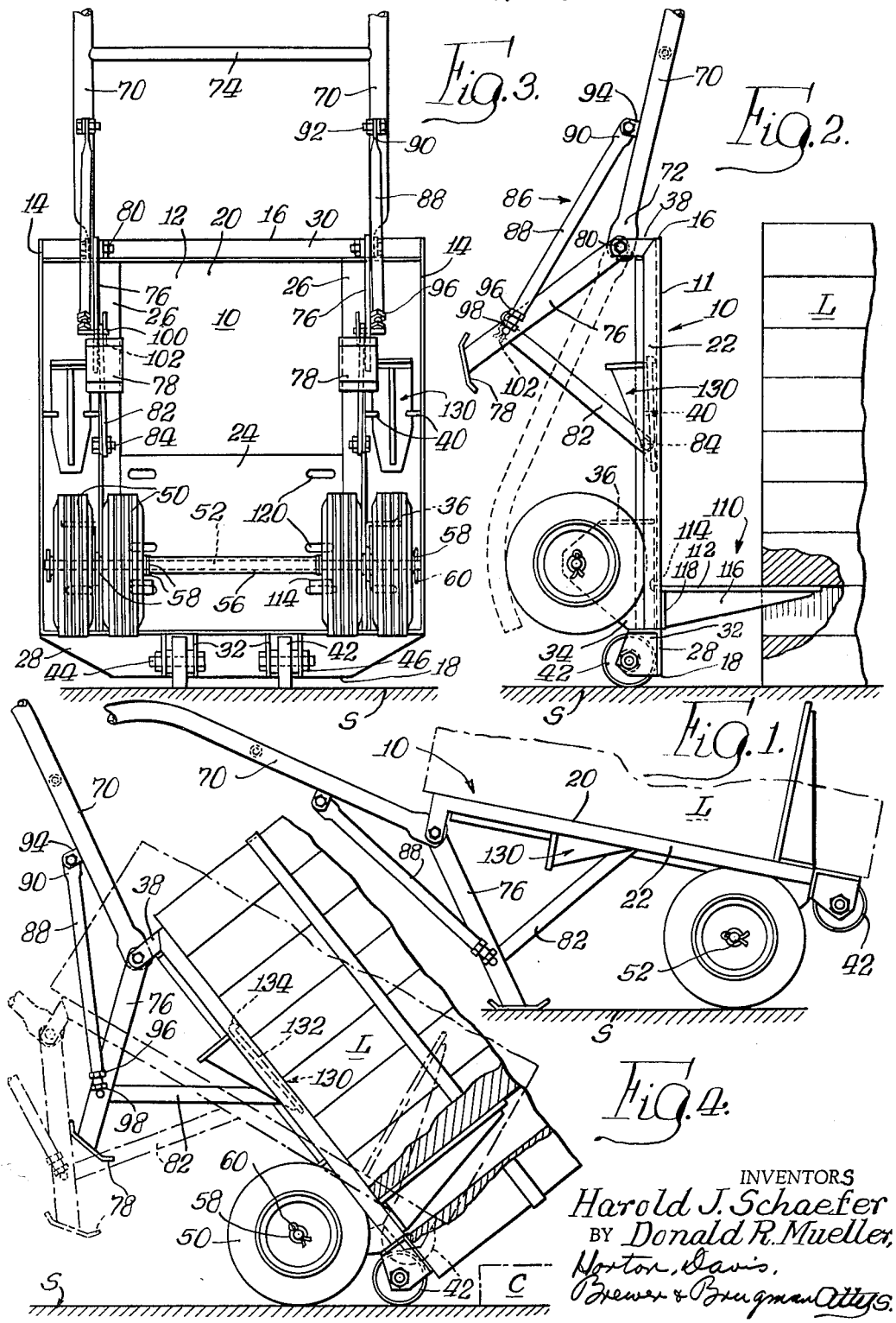

3,258,275
APPARATUS FOR HANDLING BLOCK-TYPE
MATERIAL
Harold J. Schaefer, 130 W. Bluff St., and Donald R.
Mueller, R.F.D. 4, both of Streator, Ill.
Filed Dec. 3, 1963, Ser. No. 327,765
2 Claims. (Cl. 280—47.2)

This invention relates to apparatus for handling block-type materials such as bricks, concrete blocks, structural tile and the like.

The handling incident to the transportation of and the utilization of block-type construction materials is one of the large items of cost and expense associated with such materials. Not only is that so in connection with the actual movement and transport of those materials but so also is the breakage incident to the handling a substantial and important element of cost in the ultimate structures built with those materials. That is especially true with the more fragile types of construction materials such as ceramic glazed tiles and the like.

The apparatus of this invention, a novel hand truck, facilitates the rapid and convenient handling of block-type construction materials while substantially eliminating the problems attendant the handling and transportation of block-type construction materials including the more fragile types of such materials. So also does the hand truck of this invention facilitate the pinpoint spotting and placement of the materials transported thereby, a factor of great importance at the point of initial shipment, in warehousing facilities and at the point of eventual use. In addition the hand truck of this invention facilitates the movement quickly and easily of materials to be transported thereby from one elevation to another without jarring and damaging the materials carried thereby. In these and in other ways, the highly maneuverable novel hand truck of this invention reduces the expense attendant the handling, transportation and use of block-type building materials.

In U.S. Patent No. 2,814,402, issued November 26, 1957, apparatus for handling block-type construction materials and the like was disclosed. In that patent reference was made to different types of block-type construction materials and to various manners in which they might be packaged to be handled and transported by the apparatus disclosed in that patent in the simplest possible fashion. It is contemplated that prepackaged units of block-type materials of the type and character described in that patent may be transported by and handled with the hand truck of this invention.

In its broadest aspect, this invention has for an object the provision of novel hand truck apparatus for handling and transporting block-type materials in a more efficient and a less expensive manner than is presently available.

Another object of this invention is to provide novel hand truck apparatus for handling and transporting materials such as block-type construction materials and for moving those materials manually and without great physical exertion from a first elevation to a second elevation without jarring or damaging those materials.

Yet another object of this invention is the provision of novel hand truck apparatus having a plurality of roller means positioned to facilitate the movement of said hand truck apparatus into a plurality of different basic positions relative to said plurality of roller means, those positions including one which facilitates engaging a load by the hand truck, another which rollingly supports the load upon the plurality of roller means, and another of which facilitates supporting the load upon one of said plurality of roller means at a first elevation to enable another of said plurality of roller means to rest upon a surface at a second elevation different from the first to facilitate rapid manual change of elevation from the first to the second elevation without jarring or damaging said load and with a minimum of physical exertion.

Another object within the purview of this invention is the provision of hand truck apparatus having handle means which are adjustable to the varying heights of different operators and which are foldable to render said hand truck apparatus more compact for shipping or for storage.

These and other objects and advantages of this invention will become apparent from the following detailed description and drawings of which:

FIGURE 1 is a side elevational view of a hand truck apparatus embodying the principles of this invention and shown in a load bearing position of rest upon a horizontal surface;

FIG. 2 is a side elevational view of the hand truck apparatus of FIG. 1 in a position of partial load engagement;

FIG. 3 is a bottom view of the hand truck apparatus of FIG. 1 as viewed from the left of FIG. 2; and FIG. 4 is a side elevational view of the hand truck apparatus of FIG. 1 in a load transporting position showing, in dotted line, said apparatus disposed to facilitate elevating the load from the main supporting surface to the curbing there shown.

Referring now to the drawings in greater detail, the hand truck apparatus illustrated in the embodiment of FIGURES 1 to 4 includes a platform assembly 10. The platform assembly 10 defines an upper face 11, a lower face 12, side edges 14, an upper edge 16 and a lower edge 18. Structurally, platform assembly 10 comprises a central platform plate 20 having flange-like sides 22, the flange-like side defining side edges 14 and serving to reinforce plateform plate 20. Attached, as by welding, to the underside of platform plate 20 in the lower central region thereof is a central reinforcing plate 24. Intermediate and parallel to the flange-like sides 22 of plate 20 longitudinal reinforcing angles 26 are suitably connected, as by welding, to platform plate 20. As best seen in FIG. 3, angles 26 extend the length of plate 20 and abut reinforcing plate 24. At the lower end of platform plate 20 a lower angle 28 is provided while at the upper end of platform plate 20 an upper angle 30 is provided. Angles 28 and 30 are desirably welded to platform plate 20, angle 28 in an abutting relationship to platform plate 20 and angle 30 in an underlying relationship to plate 20. Thus lower angle 28 defines the lower edge 18 of platform assembly 10 while the upper edge 16 of platform assembly 10 is defined by the edges of plate 20 and angle 30. The upper face 11 is substantially planar and comprises the upper surfaces of lower angle 28 and platform plate 20. The lower face 12 comprises several portions including the lower surfaces of platform plate 20, central reinforcing plate 24, reinforcing angles 26 and upper and lower angles 30 and 28, respectively.

Two pairs of spaced pivot wheel mounting plates 32 are suitably connected as by welding to lower angle 28. Rear wheel mounting plates 34 are suitably connected, as by welding, to longitudinal reinforcing angles 26 and to platform plate 20. Mounting plates 34 include outwardly extending flanges 36 to enhance the strength thereof. At the upper edge 16 of platform assembly 10 a pair of spaced handle anchor plates 38 are suitably connected as by welding to upper angle 30. And as may be best seen in FIG. 3, cooperating pairs of fork clips 40 are provided at the lower face 12 and at each side of platform assembly 10. One of each pair of fork clips is welded to platform plate 20 and the flange-like side 22 while the other is welded to platform plate 20 and to the longitudinal reinforcing angle 26. The fork clips are notched to cooperatively accommodate and retain forks in a manner to be described.

As it is moved from one location to another, the hand truck apparatus is adapted to be rollingly supported by one or both of a plurality of cooperating roller means. Those means include pivot wheels 42 which are rotatably mounted and supported on pivot wheel axles 44. Pivot wheel axles 44 are disposed within openings in pivot wheel mounting plates 32 and are retained therein by lock nuts 46. It is to be noted that peripheral portions of pivot wheels 42 extend forwardly of and beyond the lower edge 18 of platform assembly 10 and of lower angle 28 thereof so that as shown in FIG. 2 the hand truck apparatus may be vertically oriented and rolled on pivot wheels 42 into and out of engagement with a load L. In that position platform plate 20 is substantially normal to surface S upon which load L is supported and upon which pivot wheels 42 are adapted and intended to roll.

The plurality of cooperating wheel means also includes two pairs of rear wheels 50. Rear wheels 50, in the embodiment illustrated, comprise inflatable tires all of which are coaxially mounted on rear wheel axle 52. Each of the pairs of rear wheels 50 is closely adjacent one of the bent flange-like sides 22 of platform plate 20 and straddles one of the mounting plates 34. Openings in the mounting plates 34 accommodate tire axle 52 upon which is mounted, in addition to wheels 50, spacer tube 56 and spacer washers 58. Spacer tube 56 is dimensioned to cooperate with washers 58, mounting plates 34, wheels 50 and cotter pins 60 to position wheels 50 as desired and to limit axial movement of the wheels 50. Cotter pins 60 which pass through suitable openings in tire axle 52 lock the elements of the rear wheel assembly together.

The handle assembly is shown in a utilitarian position in FIGURES 1 through 4 while FIG. 4, in dotted line, illustrates, in part, the collapsed position most suitable for shipment or storage. Tubular handles 70 include flattened end portions 72. Between flattened end portions 72 and the remote hand grip ends (not shown) tubular handles 70 are interconnected by a reinforcing and spacing cross member 74 welded or otherwise suitably connected at its ends thereto. The flattened ends 72 are adapted to be pivotally connected to handle anchor plates 38. So also are elongated shoe bars 76 having shoes 78 at one end adapted to be pivotally connected to handle anchor plates 38. Nut and bolt locking means 80 coaxially mount flattened ends 72 and shoe bars 76 to handle anchor plates 38 and are tightened so that movement of the members axially of the locking means 80 cannot occur, but not tight enough to prevent pivoting of the handles and the shoe bars thereupon.

The handle assembly also includes struts 82. Each of the struts 82 is connected at one of its ends to a reinforcing angle 26 by nut and bolt means 84 which pass through aligned openings in the strut 82 and the longitudinal reinforcing angle 26. At its other end strut 82 is connected to a shoe bar 76. The specific means for effecting the connection includes the handle links 86. Each link 86 comprises a tubular portion 88 and an apertured flattened end portion 90. Locking nuts and bolts 92 connect the flattened end portion 90 to handle 70 through a flange 94 connected to and extending outwardly from each of the handles. Locking nuts and bolts 92 are tightened sufficiently to prevent movement of the connected members in the direction of the axis of the locking bolts while allowing pivotal movement of the handle link.

At its other end each of the handle links 86 includes a threaded nut 96 fixed thereto. Threaded nut 96 is adapted to coopreatively threadingly receive a mating elongated bolt 98. To the head of bolt 98, as best seen in FIG. 3 a rod 100 is connected as by welding. Rod 100 is long enough to pass through shoe bar 76 and strut 82 so that when provided with a cotter pin 102 at its end, and when bolt 98 is in threaded engagement with nut 96, the various portions of the handle assembly become fixed. So also does strut 82 fix shoe bar 76 with respect to platform assembly 10. It will be understood from the foregoing that it is possible to increase or decrease the effective lengths of handle links 86 by extending or retracting bolts 98. That may be done quite simply by removing cotter pins 102 from rods 100 and then removing rods 100 from the openings in shoe bars 76 and struts 82 so that elongated bolts 98 may be rotated. After rotating the bolt to provide the desired effective length of handle links 86 the handle assembly may be reassembled. The change in length of handle links 86 will cause handles 70 to pivot on nut and bolt locking means 80 thereby elevating or lowering the handles. At all times, however, struts 82 being of their fixed lengths maintain the same predetermined relationship of the shoe bars 76, the shoes and the platform assembly to each other. Of course, shoe bars 76, struts 82 and handle links 86 may be folded, along with handles 70, to provide a more compact unit for shipment or for storage, as indicated in dotted line in FIG. 4.

The load engaging members shown in the illustrative embodiment of FIGURES 1 to 4 comprise a pair of spaced forks 110. Each of the forks 110 includes an upper fork strap portion 112, a rearwardly disposed and upwardly extendnig locking flange 114, a forwardly extending reinforcing base strap 116 and a flat platform engaging gusset 118. To accommodate forks 110, openings 120 are provided in platform plate 20 and central reinforcing plate 24. These openings 120 are dimensioned and proportioned to receive locking flanges 114 of forks 110. As shown in their operative positions, forks 110 extend forwardly of platform plate 20 and are generally perpendicularly disposed with respect thereto. To maintain that angular relationship, the rear face of platform engaging gusset 118 is generally parallel to the front face of locking flange 114 and the space therebetween is substantially the same as the combined thickness of platform plate 20 and central reinforcing plate 24.

A pair of auxiliary forks 130 are illustrated as being retained by fork clips 40 which, as has been described, are notched to overlap side portions of fork strap portions 132. Because locking flanges 134 of auxiliary forks 130 extend above fork strap portions 132, as auxiliary forks 130 are moved into engagement with fork clips 40 (downwardly as seen in FIG. 3), the forks are gradually wedged between the overlapping portions of fork clips 40 and the lower face of platform plate 20.

While auxiliary forks 130 have been shown as being located between and as retained by fork clips 40, it is clear that forks 110 may be accommodated and retained thereby in the same manner. Also, since forks 130 are proportioned for use with the hand truck, they may be used in place of forks 110. In any event, whether forks 110 or forks 130 are to be used, for shipment or storage of the hand truck the most compact package exists when forks are retained by fork clips 40.

To utilize the hand truck apparatus of this invention, it is first necessary to assemble the handle assembly and to adjust the length of handle links 86 so that the height of the handles 70 is best suited to the operator who will be using the hand truck. Once that has been done, the hand truck is ready for use.

In use the hand truck is moved to a position adjacent a load. Since the embodiment herein illustrated shows the use of fork means, the load L will be described as a prepackaged unit of block-type material arranged and adapted to receive the forks. Packages of that type are described in U.S. Patent No. 2,814,402, referred to earlier herein. Depending upon the location of the fork receiving openings in load L it may be necessary to relocate forks 110 on platform assembly 10 in openings 120 other than the ones they presently occupy. When forks 110 have been properly located with respect to platform assembly 10 and with respect to load L, the hand truck is moved to the position shown in FIG. 2. In that position the hand truck is rollingly supported on surface S by pivot wheels 42. When forks 110 are disposed so that they may be guided into the openings in the load L, the hand truck is gradually moved forward until forks 110 are disposed entirely within load L and the face of load L adjacent the upper face 11 of platform assembly 10 is in engagement therewith. The hand truck is then tilted on pivot wheels 42 until the load L is supported by both pivot wheels 42 and rear wheels 50 in the manner shown in FIG. 4. In the embodiment here illustrated the axles 44 and 52 are parallel to each other. The perpendicular distance between them has been adjusted so that when supporting a normal load L in the position shown in FIG. 4, the center of gravity of load L lies therebetween. That means that the load is supported upon both sets of wheel means and that the operator may move load L from one location to another simply by overcoming rolling friction and without having to balance the load himself. That makes it possible for an operator to handle heavier loads and also reduces losses due to breakage which occur when loads are jarred because an operator loses the balance of a hand truck.

The dotted line position of the hand truck in FIG. 4 shows how a load may be moved from one elevation to another, such as from a street level surface S to an adjacent sidewalk level, smoothly and quickly and without jarring of the load. That may be done by tilting the hand truck rearwardly upon wheels 50 whereby elevating pivot wheels 42. Thereafter, and when they have been elevated sufficiently, pivot wheels 42 are moved to a position over the curbing C by rolling the hand truck forward upon wheels 50, the hand truck is pivoted and tilted forward on pivot wheels 42 and finally moved forward until rear wheels 50 overlie the curbing C. The hand truck is then disposed so that once again load L is supported upon both of the wheel means for continued movement upon both wheel means in the manner shown in the full line position of FIG. 4. While in FIG. 4 movement from one elevation to another has been illustrated by positioning pivot wheels 42 over a surface of greater elevation than the surface on which the hand truck has been rolling, it is clear that movement of the hand truck from one elevation to another may be accomplished, where necessary, by first moving the rear wheels over the surface to which the hand truck is to be transferred.

As the figures show, at least a portion of the peripheries of pivot wheels 42 and rear wheels 50 lie beneath the lower face 12 of platform assembly 10. That facilitates supporting a load upon both wheel means. So also is it that the perpendicular distance from the platform assembly upper face 11 to the remotest peripheral portion of the rear wheels is greater than the perpendicular distance from the platform assembly upper face 11 to the remotest peripheral portion of the pivot wheels. Those relationships combined with the fact that the pivot wheels 42 extend forwardly of lower edge 18 of the platform assembly 10 facilitates and makes possible the movement of the hand truck of this invention into the load engaging position of FIG. 2, to the transporting position shown in full line of FIG. 4 and to the elevation changing position represented in dotted line in FIG. 4 quickly and without jarring the load and with a minimum of physical exertion required of the operator.

As best seen in FIG. 1, the hand truck assembly of this invention may be moved to a position of rest with or without a load. In that position pivot wheels 42 are elevated and the load is supported upon shoes 78 and rear wheels 50. It is to be noted that shoes 78 are parallel to the horizontal surface when at rest. To permit that position to be a stable one, the center of gravity of the combined load and hand cart, when in the position shown in FIG. 1 must lie to the rear or left of rear wheel axle 52.

As seen in FIG. 4, shoes 78 are located intermediate the plane of the platform plate 20 and that defined by the points of contact of wheels 42 and 50 with the surface S. Shoes 78 should be sufficiently elevated above the last named plane so that substantial changes in elevation of the hand truck assembly through the intermediary of cooperating wheels 42 and 50 may be made without interference from shoes 78. In the embodiment shown herein, changes in elevation up to about six inches may be made through the intermediary of the cooperating wheel means without the jarring attendant the use of conventional hand trucks and without interference from shoes 78.

The foregoing description is intended to be illustrative only and not limiting upon our invention since many modifications and changes within the spirit and scope of this invention will become immediately apparent to those skilled in the art upon an examination of the specification and drawings. Therefore, we intend to be limited only insofar as may be necessary in view of the appended claims.

We claim:

1. A hand truck comprising a platform assembly defining a load engaging substantially planar upper face portion, an upper edge, side edges, a lower edge and a lower face portion, handle means connected to said platform assembly and extending beyond said upper edge for guiding and moving said hand truck, first roller means rotatably mounted on said platform assembly and having peripheral portions thereof extending beyond said lower edge and beneath said lower face, second roller means rotatably mounted on said platform assembly and having a peripheral portion extending beneath said lower face portion which at its greatest perpendicular distance from said upper face portion is more distant from said upper face portion than is the peripheral portion of said first roller means at is greatest perpendicular distance from said upper face portion, means connected to said platform assembly and extending forwardly from said load engaging upper face portion for engaging a load and for maintaining said load in contact with said platform assembly, said handle means connected to said platform assembly for guiding and moving said hand truck being movable to a first position in which said platform assembly is supported upon said first roller means only for engagement by said load engaging means with a load, to a second position in which said first and second roller means rollingly support said platform assembly upon a surface, and to a third position in which said second roller means supports said platform assembly upon a surface and said first roller means is elevated above said surface to facilitate elevating said hand truck, said first and second roller means being wheel means, support means spaced rearwardly of said second wheel means and connected to said platform assembly, said support means being adapted to cooperate with said second wheel means to support said platform assembly upon a surface when said first wheel means is elevated above said surface, said handle means including handles pivotally connected to said platform assembly, and elongated adjustable link means extending between said support means and said handle means for pivoting said handles to different heights with respect to said platform.

2. The hand truck of claim 1 wherein said link means is releasably connected to said support means whereby said handle means and said support means are collapsible for storage and shipment.

References Cited by the Examiner

UNITED STATES PATENTS

| 1,587,842 | 6/1926 | Knox | 280—47.2 X |
| 1,816,825 | 7/1931 | Bates | 214—380 X |
| 2,818,988 | 1/1958 | Dunkin | 214—384 |

GERALD M. FORLENZA, *Primary Examiner.*

A. MAKAY, *Assistant Examiner.*